(12) United States Patent
Jeansonne et al.

(10) Patent No.: US 11,321,454 B2
(45) Date of Patent: May 3, 2022

(54) NOTICE OF INTRUSION INTO FIRMWARE

(71) Applicant: HEWLETT-PACKARD DEVELOPMENT COMPANY, L.P., Houston, TX (US)

(72) Inventors: Jeffrey Kevin Jeansonne, Houston, TX (US); Richard A. Bramley, Jr., Mansfield, MA (US); Vali Ali, Cypress, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 602 days.

(21) Appl. No.: 15/749,112

(22) PCT Filed: Jan. 25, 2016

(86) PCT No.: PCT/US2016/014776
§ 371 (c)(1),
(2) Date: Jan. 30, 2018

(87) PCT Pub. No.: WO2017/131622
PCT Pub. Date: Aug. 3, 2017

(65) Prior Publication Data
US 2018/0232521 A1 Aug. 16, 2018

(51) Int. Cl.
*G06F 21/55* (2013.01)
*G06F 21/57* (2013.01)
*G06F 21/52* (2013.01)

(52) U.S. Cl.
CPC ............ *G06F 21/554* (2013.01); *G06F 21/52* (2013.01); *G06F 21/552* (2013.01); *G06F 21/572* (2013.01); *G06F 21/575* (2013.01); *G06F 2221/2101* (2013.01); *G06F 2221/2151* (2013.01)

(58) Field of Classification Search
CPC .... G06F 21/554; G06F 21/552; G06F 21/475; G06F 2221/2151; G06F 21/572; G06F 21/52; G06F 2221/2101
USPC .......................................................... 726/23
See application file for complete search history.

(56) References Cited

U.S. PATENT DOCUMENTS

| | | |
|---|---|---|
| 8,910,283 B1 | 12/2014 | Gusarov et al. |
| 2005/0086523 A1 | 4/2005 | Zimmer et al. |
| 2007/0033273 A1 | 2/2007 | White et al. |
| 2009/0172639 A1 | 7/2009 | Natu et al. |
| 2009/0254313 A1 | 10/2009 | Armour et al. |
| 2012/0005542 A1* | 1/2012 | Petersen ............ G06F 11/0709 714/48 |
| 2013/0013905 A1 | 1/2013 | Held et al. |

(Continued)

FOREIGN PATENT DOCUMENTS

| | | |
|---|---|---|
| CN | 1529170 A | 9/2004 |
| CN | 101201749 A | 6/2008 |

(Continued)

*Primary Examiner* — Jeffrey C Pwu
*Assistant Examiner* — Nega Woldemariam
(74) *Attorney, Agent, or Firm* — HPI Patent Department

(57) ABSTRACT

A computer program product for providing notifications to a user of an intrusion into firmware includes, in one example, non-transitory computer readable medium including computer usable program code embodied therewith to, when executed by a processor, detect intrusion to the firmware of a computing system during runtime in a system management mode.

14 Claims, 5 Drawing Sheets

(56) References Cited

U.S. PATENT DOCUMENTS

| | | | |
|---|---|---|---|
| 2013/0339713 A1 | 12/2013 | Huang | |
| 2014/0317422 A1 | 10/2014 | Rosenzweig et al. | |
| 2016/0063255 A1* | 3/2016 | Jeansonne | G06F 9/4401 713/2 |

FOREIGN PATENT DOCUMENTS

| | | | |
|---|---|---|---|
| CN | 102263773 | A | 11/2011 |
| CN | 102609040 | A | 7/2012 |
| CN | 104040550 | A | 9/2014 |
| CN | 104937605 | A | 9/2015 |
| WO | WO-2014175864 | A1 | 10/2014 |

\* cited by examiner

Notification 400

An unauthorized change to the BIOS has been detected and a successful recovery has been performed. This was performed automatically and there is no further user action required. This message is for informational purposes only. Any questions should be directed to your IT administrator.

[ Event Viewer ]

*Fig. 4A*

Notification 401

An unauthorized change to the BIOS has been detected. Please save all data files and perform a system shut down to allow the BIOS to be repaired and recovered.

[ Event Viewer ]

*Fig. 4B*

Notification 402

An unauthorized change to the BIOS has been detected and manual recovery is required. Please contact your IT administrator for directions and next steps.

[ Event Viewer ]

*Fig. 4C*

NOTICE OF INTRUSION INTO FIRMWARE

BACKGROUND

A computing system includes computer usable program code to perform various startup functions of the computing system. This computer usable program code can include Basic Input/Output System (BIOS) code as well as other types of firmware. BIOS code can be the subject of attacks by, for example, malware introduced into the computing system or from an external service. As a result of an attack, the BIOS code may become compromised and/or corrupted.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIGS. 4A-4C are diagrams of notifications according to an example of the principles described herein.

Throughout the drawings, identical reference numbers designate similar, but not necessarily identical, elements.

DETAILED DESCRIPTION

Figure 1:
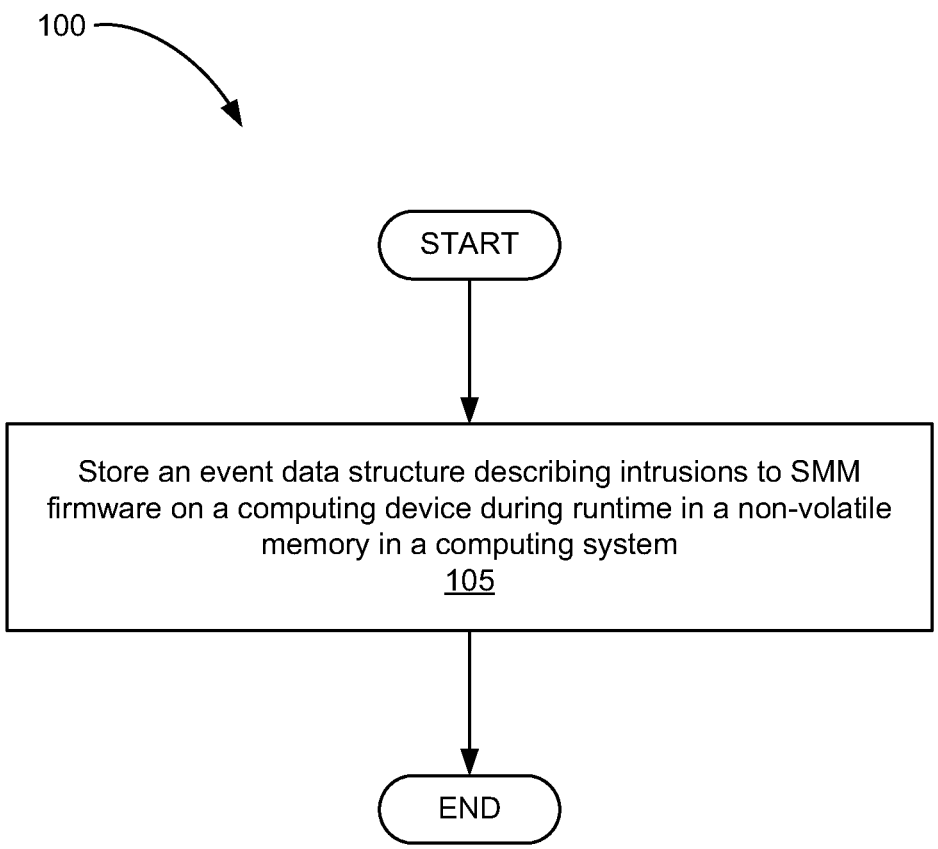
FIG. 1 is a flowchart showing a method of a logging events and providing notification of intrusions to SMM firmware on a computing device during runtime according to one example of the principles described herein.

Malware attacks on computer firmware such as the BIOS used to perform startup of a computing system can cause the integrity of the computing system to be compromised such that unauthorized access and operations in the computing system can occur. For example, compromised BIOS can allow covert remote monitoring and/or control of the computing system by a malicious entity, unauthorized access and/or modification of data in the computing system by malware, disablement of the computing system, and so forth. Compromised BIOS can refer to system code that has been corrupted such that the system code is no longer usable, or alternatively, compromised system code can refer to system code that has been changed in some way but that is still able to execute other program code such as an operating system (OS). The BIOS can be compromised intentionally.

The BIOS can be stored in a non-volatile memory of the computing system. The BIOS is accessed during operation of the computing system to ensure correct operation of the computing system. The BIOS can be stored in various data structures in the non-volatile memory, and can relate to a configuration of at least one physical component of the computing system. For example, the BIOS can relate to a configuration of the computing system, or alternatively, the BIOS has code relating to a configuration of an individual physical component or multiple physical components of the computing system. Once the BIOS is compromised, correct operation of the computing system may not be possible.

To protect the BIOS and/or BIOS data from being compromised, due to, for example, a malware attack, a secondary non-volatile memory may be provided in addition to a primary non-volatile memory: both physically coupled to the mother board. The secondary non-volatile memory may then be used to store a copy of the BIOS and system date. The BIOS copy on the secondary non-volatile memory can be a duplicate of the BIOS in the primary non-volatile memory. Alternatively, the BIOS copy in the secondary non-volatile memory may be different version (later version or earlier version) than the BIOS in the primary non-volatile memory. Similarly, a copy of the BIOS can be stored in a secondary non-volatile memory. The BIOS copy can be identical to the BIOS data in the primary non-volatile memory, or be of a different version (earlier version or later version) of the system data in the primary non-volatile memory.

When various events, such as compromise of the BIOS or BIOS data, occur, event data corresponding to such events may be logged in a secure manner to allow for a detection and understanding. This detection and understanding may be completed by, for example, an administrator who can determine what events occurred in the computing system. The logged event and data associated with that logged event can be protected against loss due to power outage of the computing system, and can be protected against tampering, such as by malware or other computer code. In the present specification, reference may be made to logging such event data. The term "logging" is used interchangeably with "auditing," which can refer generally to an entity monitoring an event of a target system, and recording event data in response to the event.

The present specification describes a computer program product for providing notifications to a user of an intrusion into firmware such as SMM code or runtime service code which is loaded into system management RAM (SMRAM) memory during boot and subsequently executed from that memory. The computer program product includes, in an example, non-transitory computer readable medium including computer usable program code embodied therewith to, when executed by a processor, detect intrusion to the firmware of a computing device during runtime in a system management mode. These changes during runtime may be logged as described herein at an audit log by a controller associated with the processor, primary non-volatile memory. Attempted or successful changes to the firmware or attempts to execute code from an unauthorized area will be logged as described herein in an audit log by a controller associated with the processor, primary non-volatile memory, and/or secondary non-volatile memory. These events may, in an example, be mirrored to a user interface listing those events via Windows Management Instrumentation (WMI). WMI is the infrastructure for management data and operations on Windows-based operating systems defined by Microsoft Corporation available in multiple operating systems.

The present specification further describes a computer program product for providing notifications to a user of an intrusion into firmware of a computing system includes non-transitory computer readable medium including computer usable program code embodied therewith to, when executed by a processor, detect intrusion to the firmware of a computing device during runtime in a system management mode.

The present specification further describes a method for logging events and providing notification of intrusions to SMM firmware on a computing device during runtime, comprising storing an event data structure describing intrusions to SMM firmware on a computing device during runtime in a non-volatile memory in a computing system The present specification also describes a computer user interface including a first window indicating a notice that an intrusion into SMM firmware of a computing system has occurred and an indicator describing how a user is to obtain more details on the event.

As used in the present specification and in the appended claims, the term "BIOS" is meant to be understood broadly as a computing systems code that controls basic hardware operations, such as interactions with diskette drives, hard disk drives, and the keyboard and can include any computer usable program code that are able to perform startup of the computing system. The BIOS can perform checking of hardware components to ensure that the hardware components are present and functioning properly. This can be part of a power-on self-test (POST) procedure, for example. After the POST procedure, the BIOS can progress through the remainder of a booting sequence, after which the BIOS can load and pass control to the OS. In some examples, the BIOS can include a runtime portion that is executed after the OS loads. In the present discussion, although reference is made to "BIOS" it is noted that techniques or mechanisms can be applied to other types of system boot code, where system boot code can refer to any code that can boot a computing system after restart of the computing system or can resume the computing system from a low power state. The BIOS also includes a number of UEFI features (e.g., variable read/write, capsule update, etc.) and additional OEM value add features in areas like security, BIOS update, etc.

Additionally, as used in the present specification and in the appended claims, the term "intrusion" is meant to be understood as an attempt to hack into, disrupt, or deny service to a computing system via, for example, manipulation of the BIOS. In an example, an intrusion may include detection of attempted changes to firmware, detected successful changes to firmware, or attempted execution of code from an area of a computer readable memory where authorization has not been provided to execute code therefrom.

Further, as used in the present specification and in the appended claims, the term "malware" is meant to be understood as a computer program that is designed to intrude upon the BIOS of a computing system in order to hack into, disrupt, or deny service to the system.

Still further, as used in the present specification and in the appended claims, the term "runtime" is meant to be understood as the time period during which a computer program, including an operating system, is running.

Even further, as used in the present specification and in the appended claims, the term "system management mode (SMM)" is meant to be understood as an operating mode of x86 central processor units (CPUs) in which execution of at least the operating system is suspended and separate software, which is part of the firmware, is executed with high privileges.

Even still further, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

FIG. 1 is a flowchart showing a method (100) of logging events and providing notification of intrusions to SMM firmware on a computing device during runtime according to one example of the principles described herein. The method (100) may begin with storing (105) an event data structure (e.g. an audit log) describing intrusions to SMM firmware on a computing device during runtime in a non-volatile memory. The non-volatile memory may be electrically isolated from a bus that is accessible by a processor (or processors) of the computing system. In response to an event detected by or reported to an embedded controller (EC), the embedded controller adds event data corresponding to the event to an entry of the audit log. Events detected to or reported to the EC may be cases where the firmware in a ROM/flash chip has modified the EC itself, or, in the case where SMM code is changed, other components/software may detect the problem and report the event to the EC. Event data may also be added to the audit log in response to other types of events, as further described below. An embedded controller is a controller in the computing system that is separate from the processor(s) of the computing system, and the embedded controller is used for performing various designated tasks (discussed further below). In the present specification, reference is made to storing event data in an audit log. In other examples, event data can be stored in other types of event data structures.

The method (100) may include synchronizing, via a WMI, event data from the audit log to a user interface during runtime of an operating system (OS). In an example, the data passed through the WMI may be relatively small (e.g., a number) to the data stored on an audit log and a WMI consumer in windows may additionally search for a remainder of the event data in a library or other source. The synchronization of the event data may be accomplished through the use of a Windows Management Instrumentation (WMI) that includes an infrastructure for enabling the management of the platform devices and application described herein.

Figure 2:
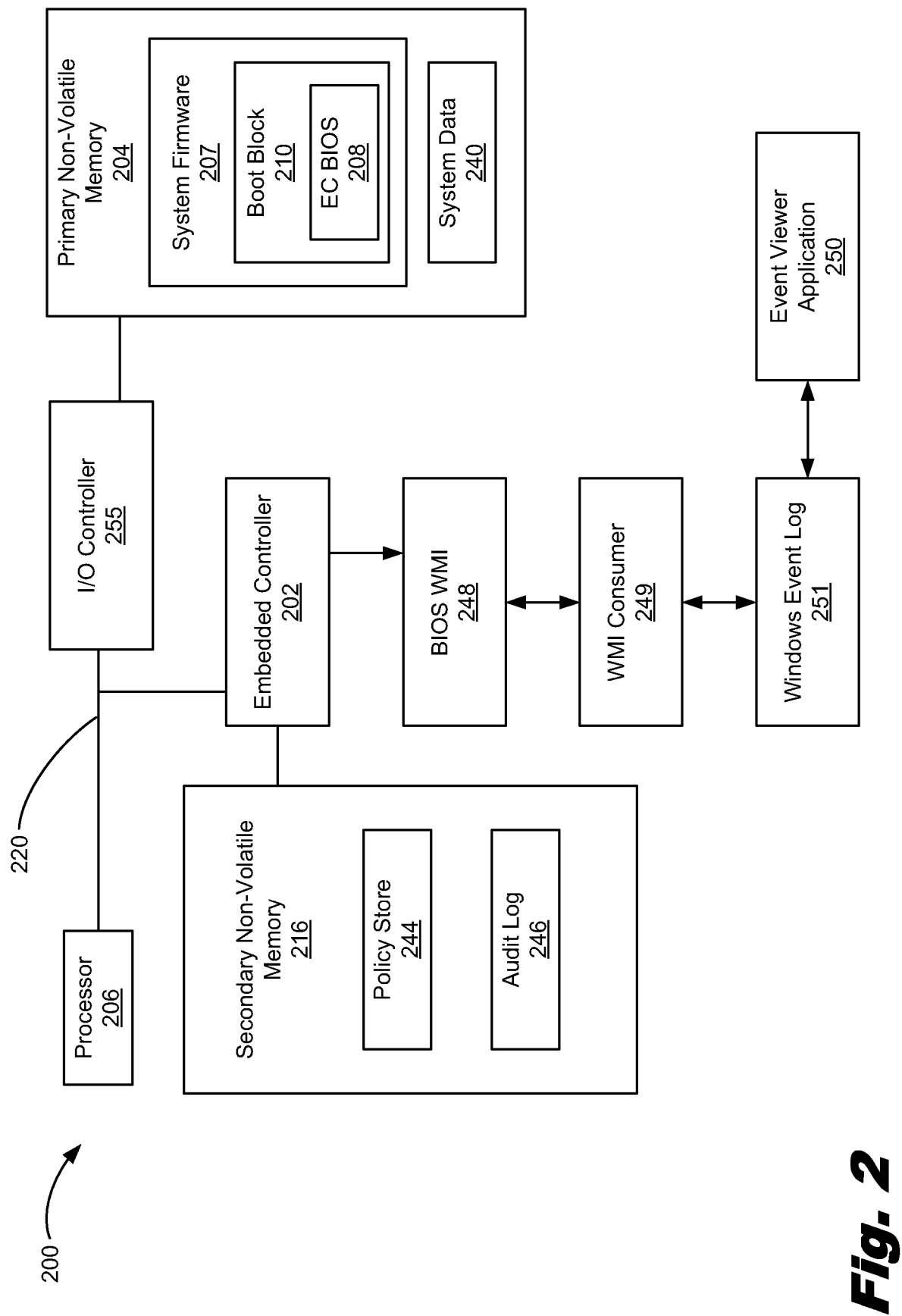
FIG. 2 is a block diagram of a computing system used to log events and provide notification of firmware intrusions to an OS during runtime according to an example of the principles described herein.

FIG. 2 is a block diagram of a computing system (200) used to log events and provide notification of changes to a BIOS during runtime according to an example of the principles described herein. The computing system (200) may include an embedded controller (202), a primary non-volatile memory (204), a processor (206), and a secondary non-volatile memory (216). The primary non-volatile memory (204) is a shared non-volatile memory that it is accessible by multiple entities, including the embedded controller (202) and at least one other entity (including the processor (206)). The secondary non-volatile memory (216) is accessible by the embedded controller (202), but is inaccessible to the processor (206) or to other components in the computing system (200). Effectively, the secondary non-volatile memory (216) is electrically isolated from entities other than the embedded controller (202). Making the secondary non-volatile memory (216) inaccessible to the processor (206) and other components protects the content of the secondary non-volatile memory (216) from unauthorized tampering. The secondary non-volatile memory (216) can be accessible by the embedded controller (202).

In an example, an input/output (I/O) controller (255) may be provided between the processor (206) and the primary non-volatile memory (204). The I/O controller is part of the core logic of the computing system (200). The processor (206) can access the shared bus (220) through the I/O controller to retrieve content of the primary non-volatile memory (204).

The secondary non-volatile memory (216) can be physically separate from the primary non-volatile memory (204) (such as implemented in different physical memory devices). Alternatively, the secondary non-volatile memory (216) and the primary non-volatile memory (204) can physically reside on a common memory device, but the primary non-volatile memory (204) and the secondary non-volatile memory (216) are in different segments of the physical memory device, where the segment of the physical memory device that contains the secondary non-volatile memory (216) is accessible by only the embedded controller (202). In other words, the segment that contains the secondary non-volatile memory (216) is under exclusive control of the embedded controller (202), and this segment can be locked from access by the processor (206) or another entity during runtime of the computing system (200), after an initial boot period.

In an example, an audit log entry may be added at runtime of an operating system (OS) which will result in the EC triggering a WMI event that software within the operating system will see and trigger a notification, move the event data into the Windows Event Log, or combinations thereof. In an example, the event viewer application (250) further includes a user interface that may be opened from either a desktop icon or via the notification. This user interface may mirror those events from the audit log (246) in which the embedded controller (202) has indicated as an intrusion or change in the BIOS. The above notifications can be done in real-time at runtime: while the operating system is executing.

In an example, the notification may indicate to the user that changes to a BIOS or an intrusion to the BIOS has occurred and that certain actions will be taken by the computing system (200). Still further, in an example, the notifications may provide a link that, when actuated, opens a user interface that mirrors a number of events discovered by the embedded controller (202).

The primary non-volatile memory (204) is accessible over the shared bus (220) by the embedded controller (202) or by another entity. In some implementations, a single entity can have access to the shared bus 220 at any given time, such that a single entity can access the primary non-volatile memory (204) at a time. In some examples, the shared bus (220) is a shared Serial Peripheral Interface (SPI) bus. An SPI bus is a synchronous serial data link in which devices on the SPI bus operate in a master-slave mode. In other examples, another type of shared bus (220) can be used. In alternative examples, an arbitration mechanism can be provided to allow for shared access of the bus (220) in various states of the computing system, including a low power state and a normal runtime state.

The non-volatile memory (204) can store system firmware (207), which can include BIOS code. The system firmware (207) can include EC firmware (208) that is for execution by the embedded controller (202), and a boot block 210 that is to be executed by the processor (206). The EC firmware (208) is included in the boot block (210) of the system firmware (207). Including the EC firmware (208) inside the boot block (210) can provide an indication that the EC firmware (208) has been signed by the entity that provided the system firmware (207), which can be the vendor of the computing system (200), or another entity. In other examples, the EC firmware (208) can be separate from the boot block (210).

The boot block (210) is a part of the BIOS code, and is first executed when the computing system (200) starts up. The boot block (210) is executed first before the rest of the BIOS code is allowed to execute on the processor (206). The boot block (210) can be used to check the integrity of the BIOS code as well as to perform other initial functions. If the boot block (210) confirms the integrity of the BIOS code, then the boot block (210) can pass control to the main portion of the BIOS code for initiating the remaining operations associated with the BIOS code.

The embedded controller (202) can be used to perform specific predefined tasks, as programmed into the EC firmware (208). Examples of tasks that can be performed by the embedded controller (202) include any one or some combination of the following: power supply control in the computing system (200) (for controlling a power supply that supplies power supply voltages to various components in the computing system (200)), charging and control of a battery in the computing system (200), thermal monitoring (to monitor a temperature in the computing system (200)), fan control (to control a fan in the computing system (200)), and interaction with a user input device (such as performing a scan of a keyboard of the computing system (200) or interaction with a pointing device such as a mouse, touchpad, touchscreen, and so forth). Further examples of tasks that can be performed by the embedded controller (202) include the handling of logging of events and the generation of any WMI events.

In an example, a secondary non-volatile memory (216) stores a redundant copy of system firmware, where the system firmware redundant copy includes a boot block and an EC firmware (230). The secondary non-volatile memory (216) can also store a copy of the system data. In this example, copying of the system firmware and system data to the secondary nonvolatile memory (216) can be performed by the embedded controller (202).

The secondary non-volatile memory (216) further stores a policy store (244) to store policy information, and an audit log (246) to store event data relating to events associated with the embedded controller (202) and/or system firmware (207), and/or other events. The policy information can pertain to policies relating to execution of the controller code on the embedded controller (202). Event data can be added to the audit log (246) in the secondary nonvolatile memory (216) in response to various events described herein. The adding of event data to the audit log (246) is controlled by the embedded controller (202).

Examples of events detectable by the embedded controller (202) that can trigger the addition of event data to the audit log (246) by the embedded controller (202) include the following: events relating to failure to load the EC firmware from the secondary nonvolatile memory (or the EC firmware (208) from the primary non-volatile memory (204)) into the embedded controller (202); events relating to compromised or missing boot block (BB) (210) in the primary nonvolatile memory (204); events relating to compromised or missing boot block in the secondary non-volatile memory (216); events relating to compromised or missing system data in the primary nonvolatile memory (204) or secondary non-volatile memory (216); events relating to updating the boot block (210) in the primary non-volatile memory (204) with the boot block in the secondary non-volatile memory (216); events relating to updating the boot block in the secondary non-volatile memory (216) with the boot block (210) in the primary non-volatile memory (204); events relating to repairing the system data in the primary non-volatile memory (204) or secondary non-volatile memory (216); events relating to an incorrect version of the boot block (210) in the primary nonvolatile memory (204), in a scenario where a BIOS update policy is in a locked mode (where locked mode causes system firmware to be locked to a specific version, such as the version in the secondary non-volatile memory (216)); events relating to an incorrect version of the boot block in the secondary non-volatile memory (216), in a scenario where the BIOS update policy is in the locked mode; events relating to a recovery of the system firmware (207) being on hold, pending receipt of a manual recovery input from a user; events relating to receipt of a manual recovery command relating to recovery of the system firmware (207); events relating to integrity check failure of the audit log (246); events relating to integrity check failure of the policy store (244); events relating to a change of a manufacturing mode of the computing system (200); among others. These events are assigned identification numbers for each of reviewing the audit log (246). Any arrangement of numbering of the above identified events and may not be limited to the events described above. In one example, a dynamic library may be created which provides the event viewer application (250) operating on the OS to cross-reference these event identification numbers with additional information describing details of the detected events.

Although various events are listed above, it is noted that in alternative implementations, other events can also trigger the addition of event data to the audit log (246) by the embedded controller (202).

Using techniques or mechanisms according the present specification, various events relating to operation of the embedded controller (202) and the system firmware (207) can be logged into the audit log (246). By storing the audit log (246) in the secondary non-volatile memory (216), event data is not lost due to power loss of the computing system (200).

Event data is sent to a recipient to allow for analysis of the event data. The recipient can be a remote computing system that is associated with an administrator, for example. Alternatively, the recipient can be a tool executable in the computing system (200) for analyzing event data. As will be described in more detail below, the event data may also be provided to a user of the computing system (200) via use of a BIOS WMI (248) and an executable event viewer application (250) that mirrors the event data associated with the audit log (246) into a user interface. Here, a user may be made aware, in real time, of intrusions into the firmware and specifically the BIOS of the system via a notification. The notifications may provide a link to open an event log application populated with the mirrored events of the audit log (246).

In an example, the embedded controller (202) can associate a timestamp with each event data added to the audit log 246, where the timestamp can be obtained from a secure time source, such as a time source according to a secure Network Time Protocol (NTP). Use of a secure time source allows a user of the computing system (200) to be assured that a timestamp in an audit log entry as recorded in the secondary non-volatile memory (216) is correct.

An example of event data stored in an audit log generated by the embedded controller (202) is described in international patent application publication number WO 2014/175864. The subject matter of international patent application publication number WO 2014/175864 is incorporated by reference in its entirety herein.

As described above, the computing system (200) may further include a BIOS WMI (248) and an event viewer application (250) used to notify a user of the computing system (200) of the occurrence of an event and provide a user interface to view different events described herein. The embedded controller (202) may signal an event to the BIOS WMI (248). The BIOS WMI (248) may receive data associated with the event such as the timestamp and/or event identification code associated with the event and have that information passed through the stack to the event viewer application (250) which consumes the data associated with the event for presentation to a user.

Figure 3:
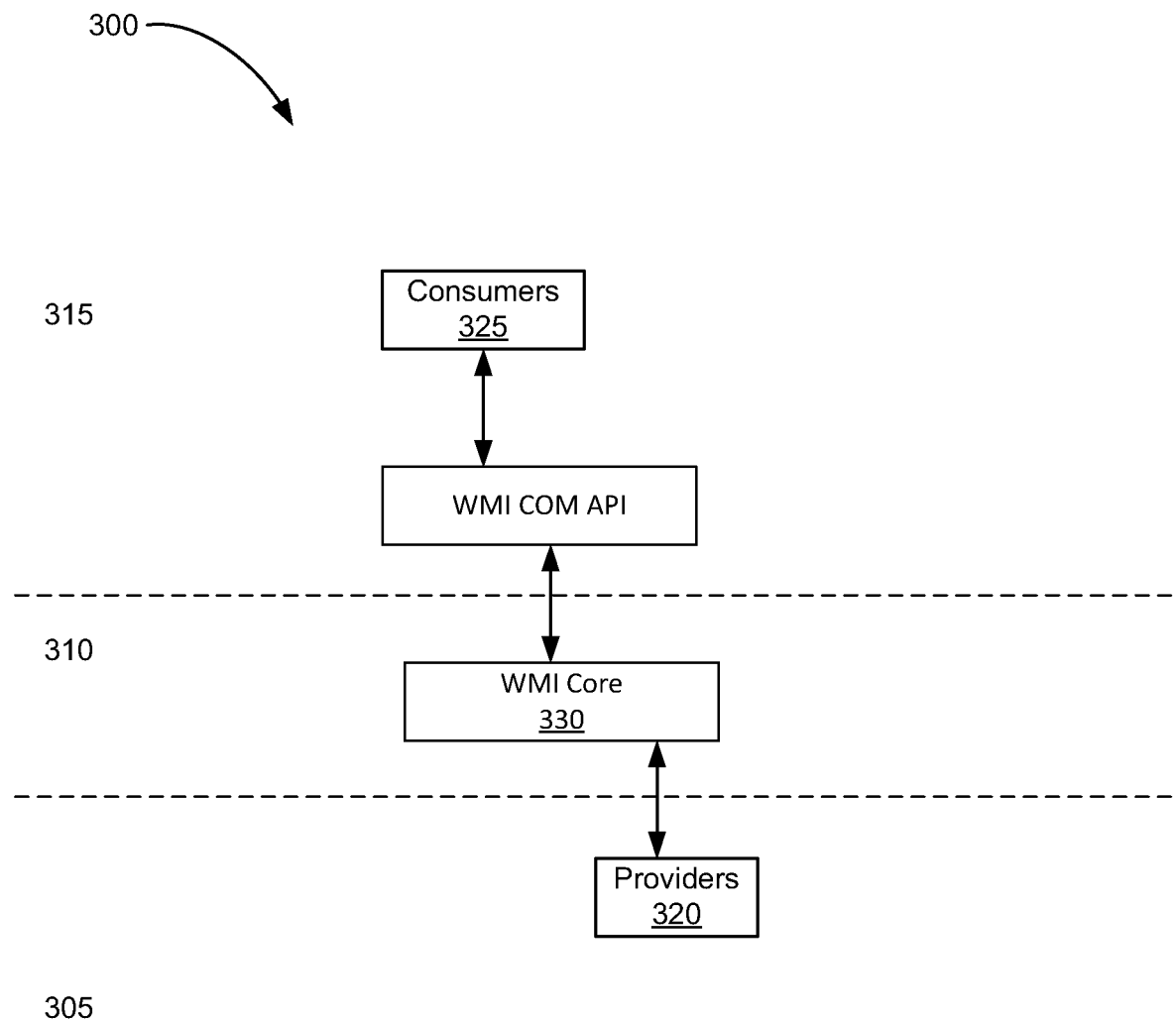
FIG. 3 is a block diagram of a WMI infrastructure used to mirror the event data to a user interface according to one example of the principles described herein.

FIG. 3 is a block diagram of a WMI architecture (300) used to mirror (FIG. 1, 115) the event data to a user interface according to one example of the principles described herein. The architecture (300) may include a WMI providers and manage objects level (Level 1; 305), a WMI infrastructure level (Level 2, 310), and a WMI consumers (management applications) level (Level 3; 315). Any number of providers (320) at Level 1 (305) generate events to let a number of WMI consumers (325) at Level 3 (315) know that some data in the BIOS has changed. The consumers may implement a user interface implementing, in an example, a pop-up window to indicate to a user that an event has occurred.

FIGS. 4A-4C are diagrams of notifications (400, 410, 402) presented by the event viewer application (FIG. 2, 250) according to an example of the principles described herein. The notifications (400, 401, 402) may be presented to a user as a number of pop-up windows indicating a number of event messages from the event log. These number of popup windows may provide a link to an event viewer window described below. Additionally, each of these notifications (400, 410, 402) may include the current status of the event viewer application (FIG. 2, 250) such as whether the application (FIG. 2, 250) is active and when the most recent intrusion to the firmware was detected. As described above, the notifications (400, 410, 402) may be displayed based on generated events which generally fall into two categories: those events related to the periodic checking of the integrity of the firmware boot image in the system board flash chip; and any new notifications that are part of a runtime firmware intrusion detection. These notifications (400, 410, 402) may be presented whenever a WMI event is generated by the embedded controller (FIG. 2, 202) or upon boot/resume from sleep/hibernation when new events are found in the audit log (FIG. 2, 246).

In an example shown in FIG. 4A, a first notification (400) may provide the following statement: "An unauthorized change to the BIOS has been detected and a successful recovery has been performed. This was performed automatically and there is no further user action required. This message is for informational purposes only. Any questions should be directed to your IT administrator." This notification consequently indicates that an integrity problem was identified in a flash device storing the BIOS or the copy of the BIOS described above.

In an example shown in FIG. 4B, a second notification (401) may provide the following statement: "An unauthorized change to the BIOS has been detected. Please save all data files and perform a system shut down to allow the BIOS to be repaired and recovered." This notification consequently indicates that an integrity problem was identified in a flash device storing the BIOS or the copy of the BIOS described above and that a shutdown procedure of the computing system (FIG. 2, 200) will repair the BIOS. Here, the repair will occur as soon as the computing system (FIG. 2, 200) shuts down.

In an example shown in FIG. 4C, a third notification (402) may provide the following statement: "An unauthorized change to the BIOS has been detected and manual recovery is required. Please contact your IT administrator for directions and next steps." This third notification (402) may be displayed in situations where an issue was found with the BIOS, but the manager of the computing system (FIG. 2, 200) has changed a policy such that repair of the BIOS has been indicated to be done manually instead of automatically. Here, the computing system (FIG. 2, 200) will not repair the BIOS until the local user enters, for example, a manual recovery key sequence.

Additional information may be included in the notifications (400, 401, 402) described above. For example, the notice may include suggested remediation's or suggestions on how to avoid future problems.

Figure 5:
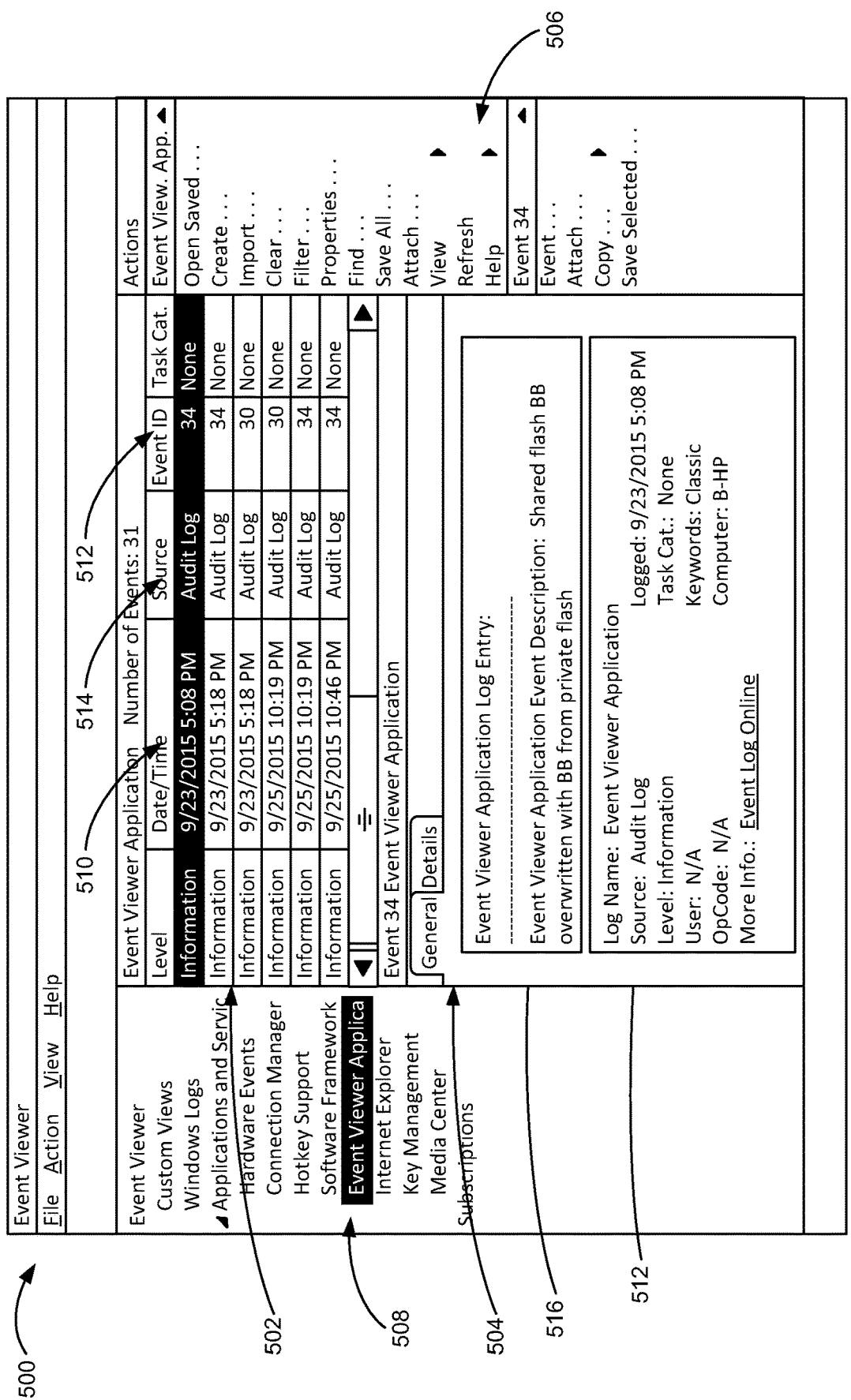
FIG. 5 is a diagram of a Windows Event Log user interface comprising a number of event logs associated with changes to the firmware of a computing system according to one example of the principles described herein.

As described above, an embedded controller (FIG. 2, 202) may cause an operating system (OS) to execute on the computing device (FIG. 2, 200) causing the execution of an event viewer application (FIG. 2, 250). FIG. 5 is a diagram of a user interface (500) comprising a number of event logs (502) associated with changes to the firmware of a computing system (FIG. 2, 200) according to one example of the principles described herein. The user interface (500) may include an event list window (502), an event detail window (504), an action window (506), and an event viewer explorer window (508).

The event list window (502) includes a listing of those events as compiled in the audit log (FIG. 2, 246) of the secondary non-volatile memory (FIG. 2, 216). As described above, each of the events listed in the event list window (502) includes a timestamp (510) indicating when the event occurred. Additionally, each of the events includes an event ID (512) as described above in table group 1. These event IDs may be further detailed in the event detail window (504). Additional fields may be presented to the user in the event list windows (502) such as a source ID (514) indicating the source of the event. In an example, the source may be the embedded controller (FIG. 2, 202). Other examples of information that can be provided for each event in the event list window (502) may include an event severity level indicator indicating how sever the event is. Additionally, the event list window (502) may include a numerical indicator of how many events are listed. Here, the number of events may be limited numerically by the amount of storage capacity of the secondary non-volatile memory (FIG. 2, 216) and specifically the amount of memory in the secondary non-volatile memory (FIG. 2, 216) allocated for the audit log (246).

The event detail window (504) presents a relatively more detailed view of each of the events listed in the event list window (502). These details of each of the events in the event detail window (504) may be revealed when a user highlights the event using an input device such as a mouse. In an example, the event ID (512) may be repeated in the event detail window (504) with a corresponding explanation (516) as to what the event ID (512) means. The explanation (516) for each of the event IDs (512) that could be presented are again presented above in table group 1. Although table group 1 shows a number of event IDs (512), this table group is not meant to be limiting and any number of event IDs may be provided based on any number of intrusion type actions against The action window (506) may provide any number of potential actions a user may initiate upon selection of a specific action. By way of example, the user may select a clearing action that clears out the list of events in the event list window (502). Not every action, however, may act globally on each of the events listed in the event list window (502). In one example, a user may select a copy event action to copy an event as well as other actions that may allow a user to act on an event accordingly. Still further, the action window (506) may allow a user to search through a number of listed events in the event list window (502) in order to find specific events the user may be concerned about.

The event viewer explorer window (508) may allow the user to specifically cause the event list window (502) to appear upon selection of a particular application associated with the listing of the events described herein. The specific name of the application can vary based on proprietary nomenclature of the developer of the event viewer application (FIG. 2, 250). However, this event viewer application (FIG. 2, 250) may be listed among a number of other applications in the viewer explorer window (508). Thus, the events will be populated specifically into the event viewer application (FIG. 2, 250) instead of the general warning or error level (WEL) of the event viewer (508).

The event viewer application (FIG. 2, 250) may further include a system center configuration manager (SCCM) agent that will be installed as part of a remote deployment from an SCCM console. The agent may support the sending of new WEL entries to the remote SCCM console, reporting of the current policy settings of the client to the remote SCCM console, and receive and apply new policy settings from the remote SCCM console. These policy settings may include any number of configurable policy settings. In an example, the policies may be configurable via an F10 setup or public WMI.

An example of policy is the runtime firmware intrusion detection actions that take place upon detection of an intrusion to the firmware. Additionally, the user may enable a restart configuration which restarts the computer system (FIG. 2, 200) upon detection of an intrusion thereby foregoing the ability to receive runtime notifications. This configuration may also be disabled allowing the user to receive runtime notifications without the computing system (FIG. 2, 200) restarting automatically.

The user may also be allowed to configure whether notifications are received during runtime and at boot-up of the computing system. The runtime notifications may be displayed by a SW within the OS on each detection event generated by firmware. The "at boot" notifications maybe displayed by the firmware on any boot subsequent to one or more detection events during a previous boot. It should be noted that any of these notifications (400, 401, 402) may be provided to the user regardless of whether the intrusion or changes to the firmware has been resolved. Additionally, the user may be allowed, via the SCCM agent to configure what action is to be taken based on the severity of the event detected. For example, a user may indicate that for intrusions into the SMM firmware that did not result in changes to the firmware, a notification will be presented to the user indicating as such. In an example, a user may indicate that for intrusions into the SMM firmware that did result in changes to the firmware, the computing system is to reboot. In a further example, the user may indicate that a notification will be presented to the user regardless of the severity of the event in order to allow the user to save data and manually reboot the computing system.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (206) or embedded controller (202) of the computer system (200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a system and method of providing notification of intrusion into firmware during runtime in a system management mode. This system can verify the integrity of the firmware boot block before a host processor is allowed to execute the boot block. The system further provides for the capability to repair the firmware boot block before a host processor executes corrupted firmware. Additionally, the system allows for a user, in real-time and during runtime of an OS, to be notified of any intrusions into the firmware.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computer program product for providing notifications to a user of an intrusion into system management module (SMM) firmware comprising:
   non-transitory computer readable medium comprising computer usable program code embodied therewith to, when executed by a processor, detect intrusion to the SMM firmware of a computing system while an operating system is running;
   perform different actions in response to the intrusion and based on a severity of the intrusion as determined on a user input, including:
   responsive to an intrusion that results in changes to the SMM firmware, automatically reboot the computing system; and
   responsive to an intrusion that does not result in changes to the SMM firmware, provide a notification to a user regarding the intrusion.

2. The computer program product of claim 1, comprising computer usable program code to, when executed by the processor, provide a second notification via a user interface to the user when attempted or successful changes to the firmware are detected or when an attempt is made to execute code from an area of the computer readable memory where authorization has not been provided to execute code therefrom.

3. The computer program product of claim 2, wherein the computer usable program code is to, when executed by the processor, provide the second notification to the user via an operating system event viewer log, an immediate user notification, a boot notification, or combinations thereof.

4. The computer program product of claim 1, comprising computer usable program code to, when executed by the processor, execute a system center configuration manager (SCCM) agent to receive a number of policy settings from the user of the computing system.

5. The computer program product of claim 4, wherein the policy settings comprise enablement of a restart procedure of the computing system upon detection of an intrusion; enablement of runtime notifications to be presented to the user; enablement of a third notification presenting to a user options on how to address the intrusion, or combinations thereof.

6. The computer program product of claim 3, wherein the operating system event viewer log accumulates a plurality of event logs by synchronizing them with an audit log when the computing system boots up, when the computing system is resumed from a hibernation state, when the computing system is resumed from a sleep state, when notified via a WMI event of a new log entry, or combinations thereof.

7. A method for logging events and providing notification of intrusions to system management mode (SMM) firmware on a computing device during runtime, comprising:
   storing an event data structure describing intrusions to SMM firmware on a computing device during runtime in a non-volatile memory in a computing system;
   performing different actions in response to an intrusion and based on a severity of the intrusion as determined on a user input, including:
   responsive to an intrusion that results in changes to the SMM firmware, automatically rebooting the computing device; and
   responsive to an intrusion that does not result in changes to the SMM firmware, providing a notification to a user regarding the intrusion.

8. The method of claim 7, further comprising causing a Windows Management Instrumentation (WMI) to present to the user of the computing system a notification of an intrusion event.

9. The method of claim 8, wherein the notification of the intrusion event is a result of a real-time intrusion into a firmware of the computing system.

10. The method of claim 8, wherein the WMI comprises a basic input/output system (BIOS) WMI provider on a WMI provider stack level and a WMI consumer on a WMI consumer level.

11. A computer user interface comprising:
    a first window indicating a notice that an intrusion into system management mode (SMM) firmware of a computing system has occurred, the notice generated responsive to a severity of the intrusion meeting a user-specified standard under which an intrusion relating in changes to the SMM firmware provokes an automatic reboot of the computing system and an intrusion not resulting in changes to the SMM firmware provokes a notification to a user; and
    an indicator describing how the user is to obtain more details on the intrusion indicated in the first window.

12. The computer user interface of claim 11, comprising an event viewer associated with the first window wherein the event viewer comprises a number of events describing intrusions into the SMM firmware of the computing system.

13. The computer user interface of claim 12, wherein each of the number of events comprises a timestamp of when the event occurred.

14. The computer user interface of claim 13, wherein each of the number of events comprises an event identification indicating what type of event had occurred during the intrusion of the SMM firmware.

* * * * *